(12) United States Patent
Ishigaki et al.

(10) Patent No.: US 10,180,583 B1
(45) Date of Patent: Jan. 15, 2019

(54) OPTICAL COUPLING MODULE USING A PRISM MIRROR TO OBTAIN PARALLEL BEAMS

(71) Applicant: SHIMADZU CORPORATION, Kyoto (JP)

(72) Inventors: Naoya Ishigaki, Kyoto (JP); Koji Tojo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/019,626

(22) Filed: Jun. 27, 2018

(30) Foreign Application Priority Data

Jul. 4, 2017 (JP) .................................. 2017-130777

(51) Int. Cl.
*G02B 27/30* (2006.01)
*G02B 27/09* (2006.01)
*G02B 6/32* (2006.01)
*G02B 9/12* (2006.01)

(52) U.S. Cl.
CPC .............. *G02B 27/30* (2013.01); *G02B 6/32* (2013.01); *G02B 9/12* (2013.01); *G02B 27/0955* (2013.01); *G02B 27/0972* (2013.01); *G02B 27/0977* (2013.01)

(58) Field of Classification Search
CPC ................ G02B 27/30; G02B 27/0972; G02B 27/0977; G02B 27/0955; G02B 9/12; G02B 6/32
See application file for complete search history.

(56) References Cited

U.S. PATENT DOCUMENTS

| 6,718,088 | B2 | 4/2004 | Okazaki et al. | |
| 7,502,176 | B2* | 3/2009 | Mino | G02B 6/4214 359/719 |
| 7,559,653 | B2* | 7/2009 | Silverstein | H04N 13/337 353/7 |
| 7,804,759 | B2* | 9/2010 | Murakami | B41J 2/4753 347/232 |
| 7,992,310 | B2* | 8/2011 | Litvin | G01C 15/004 33/281 |

(Continued)

FOREIGN PATENT DOCUMENTS

| JP | 2002-202442 | 7/2002 |
| JP | 2004-077779 | 3/2004 |

*Primary Examiner* — Andrew Jordan
(74) *Attorney, Agent, or Firm* — Andrew F. Young, Esq.; Lackenbach Siegel, LLP (57) ABSTRACT

An optical coupling module reduces a number of optical elements, and includes a collimate lens 2a that collimates a light from the first semiconductor laser 1a and then outputs the first collimate light, a collimate lens 2b that collimates a light from the semiconductor laser 1b in a location at which an emission plane is approximately orthogonal to an emission plane of the semiconductor laser 1a and outputs the second collimate light. The collimate lens 2c collimates light from semiconductor laser 1c in-place in the location at which the emission plane faces the emission plane of the semiconductor laser 1b and outputs a third collimate light. A prism mirror 3 has a rectangular prism with a first reflection plane that reflects the second collimate light to a parallel direction to the first collimate light and a second reflection plane orthogonal to the first reflection plane and reflects the third collimate light to the parallel direction to the first collimate light.

4 Claims, 6 Drawing Sheets

(56) References Cited

U.S. PATENT DOCUMENTS

| | | | | |
|---|---|---|---|---|
| 9,116,421 B1* | 8/2015 | Rutherford | ......... | G03B 21/2033 |
| 9,746,615 B2* | 8/2017 | Saikawa | ................... | G02B 6/42 |
| 2005/0128441 A1* | 6/2005 | Morgan | ................ | H04N 9/3138 |
| | | | | 353/102 |
| 2008/0123509 A1* | 5/2008 | Murakami | ................ | B41J 2/473 |
| | | | | 369/121 |
| 2010/0039712 A1* | 2/2010 | Litvin | ................... | G01C 15/004 |
| | | | | 359/738 |
| 2011/0001937 A1* | 1/2011 | Matsumoto | ............. | G03B 21/16 |
| | | | | 353/54 |
| 2013/0194552 A1* | 8/2013 | Matsubara | .......... | G03B 21/2013 |
| | | | | 353/31 |
| 2014/0375956 A1* | 12/2014 | Khrushchev | .......... | H04N 9/3167 |
| | | | | 353/8 |
| 2017/0082805 A1* | 3/2017 | Saikawa | ................... | G02B 6/42 |
| 2018/0180885 A1* | 6/2018 | Holland | ............. | G02B 26/0816 |

* cited by examiner

OPTICAL COUPLING MODULE USING A PRISM MIRROR TO OBTAIN PARALLEL BEAMS

CROSS REFERENCE TO RELATED APPLICATIONS

This application relates to, and claims priority from JP 2017-430777 filed Jul. 4, 2017, the entire contents of which are incorporated herein by reference.

FIGURE SELECTED FOR PUBLICATION

Figure 1:
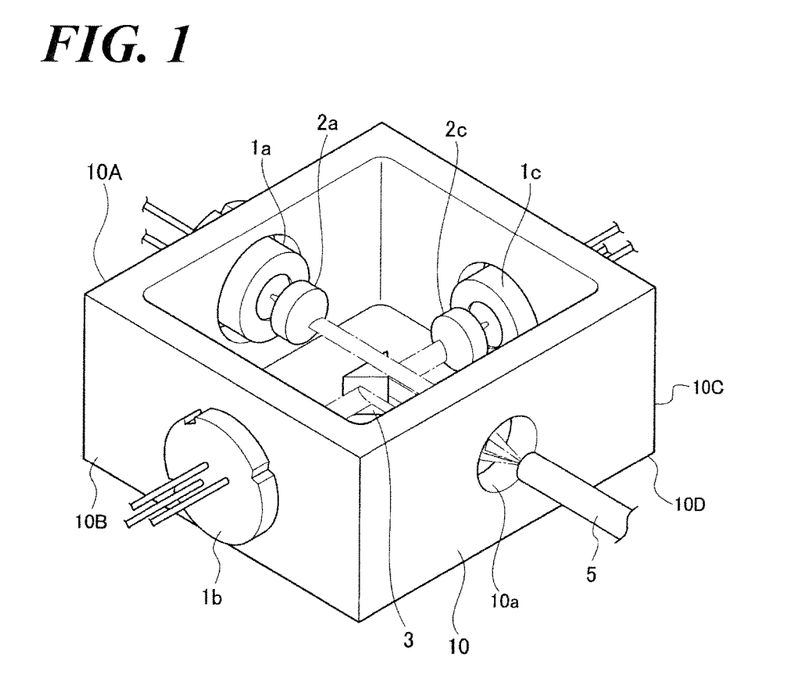
FIG. 1 is a block diagram illustrating the optical coupling module installed in a housing according to an aspect of the Embodiment 1 of the present invention.

FIG. 1

BACKGROUND OF THE INVENTION

Field of the Invention

The present invention relates to an optical coupling module that combines lights emitted from a plurality of light sources.

Description of the Related Art

An optical coupling module combines lights emitted from a plurality of light sources and emits the combined light coaxially or allows the light to be incident into one optical fiber. Such optical coupling modules are based on a wavelength multiplex mode using an optical element providing a wavelength selectivity according to the difference between wavelengths or a space coupling mode using a mirror or a prism.

When a size of an optical coupling module is small, the size and the number of mirrors and prisms that change the direction of the optical axis from each light source significantly effect on the entire size of the module, the cost thereof, and restriction of the wavelength.

When the wavelength multiplex module is applied to combine lights from a plurality of light sources, a wavelength selection element fitting to the wavelength of each light source is mandatorily used. Therefore, lowering the number of the wavelength selection element is unfeasible and unrealistic. In addition, the lights from a plurality of light sources may not be combined depending on a combination of the wavelength of the light source.

Referring to Patent Document 1, 2, when the space coupling mode is applied, the laser beams respectively emitted from a plurality of light sources installed together on the same plane are collimated by the collimate lens followed by converging using one converging lens.

RELATED PRIOR ART DOCUMENTS

Patent Document 1: JP Patent Published 2002-202442 A
Patent Document 2: JP Patent Published 2004-077779 A

ASPECTS AND SUMMARY OF THE INVENTION

According to one aspect of the present invention, there is provided an optical coupling module that reduces a number of optical elements, and includes a collimate lens 2a that collimates a light from the first semiconductor laser 1a and then outputs the first collimate light, a collimate lens 2b that collimates a light from the semiconductor laser 1b in a location at which an emission plane is approximately orthogonal to an emission plane of the semiconductor laser 1a and outputs the second collimate light. The collimate lens 2c collimates light from semiconductor laser 1c in-place in the location at which the emission plane faces the emission plane of the semiconductor laser 1b and outputs a third collimate light. A prism mirror 3 has a rectangular prism with a first reflection plane that reflects the second collimate light to a parallel direction to the first collimate light and a second reflection plane orthogonal to the first reflection plane and reflects the third collimate light to the parallel direction to the first collimate light.

OBJECTS TO BE SOLVED

Unfortunately, with respect to the laser light source disclosed in the Patent Document 1, 2, each light source has a certain outer size, so that a distance between respective light sources cannot be smaller than such outer size. In addition, a plurality of light sources is installed together on the same plane along one specific direction, so that each collimate light cannot be coaxially aligned. Therefore, the converging lens must be large and as a result, the size of the optical coupling module is inevitably large.

The purpose of the present invention is to provide an optical coupling module that allows the number of optical element to be lowered and miniaturized.

Means for Solving the Problem

To solve the above problems, a laser device, according to the aspect of the present invention, comprises: a first semiconductor laser; a first lens that collimates a light from the first semiconductor laser and then outputs the first collimate light; a second semiconductor laser that has an emission plane thereof that is in-place in an approximately orthogonal plane to the emission plane of the first semiconductor laser; a second lens that collimates a light from the second semiconductor laser followed by outputting the second collimate light; a third semiconductor laser that has an emission plane thereof that is in-place in the plane facing the emission plane of the second semiconductor laser; a third lens that collimates a light from the third semiconductor laser followed by outputting the third collimate light; a prism mirror that further comprises a rectangular prism having a first reflection plane that reflects the second collimate light to the parallel direction to the first collimate light and a second reflection plane orthogonal to the first reflection plane and reflects the third collimate light to the parallel direction to the first collimate light; and a housing that houses the first semiconductor laser to the third semiconductor laser.

The optical coupling module according to the aspect of the present invention further comprises a convergence lens that converges the first collimate light that passes through the headroom of the prism mirror, the second collimate light that the prism mirror emits and the third collimate light and is operative for the converged light to be incident into the optical fiber.

Effect of the Invention

According to the aspect of the present invention, the second semiconductor laser is orthogonal to the first semiconductor laser, the second semiconductor laser and the third semiconductor laser face each other, the prism mirror reflects the second collimate light to the parallel direction to the first collimate light, the prism mirror reflects the third collimate light to the parallel direction to the first collimate light, and then all collimate lights of the first collimate light to the third collimate light are incident into the optical fiber.

Specifically, each collimate light is coaxially aligned, so that the converging lens can be made smaller and as a result, the optical coupling module can be miniaturized. In addition, the number of the optical element can be less in accordance with the use of the prism mirror.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Reference will now be made in detail to embodiments of the invention. Wherever possible, same or similar reference numerals are used in the drawings and the description to refer to the same or like parts or steps. The drawings are in simplified form and are not to precise scale. The word 'couple', 'link', 'transmit' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Hereinafter, referring to FIGs., the inventors set forth further detail of an optical coupling module according to the aspect of the Embodiment of the present invention.

Embodiment 1

FIG. 1 is a block diagram illustrating the optical coupling module according to the aspect of the Embodiment 1 of the present invention. Such optical coupling module is an optical coupling module that connects a laser beam to a fiber (optical fiber) and the optical coupling module is mounted in the rectangular parallelepiped housing 10.

The semiconductor lasers 1a-1c are installed to the three sides 10A-10C of the housing 10. A hole 10a is formed in the side 10D of housing 10 and each laser light from the semiconductor lasers 1a-1c is incident into the fiber 5 through the hole 10a.

Figure 2:
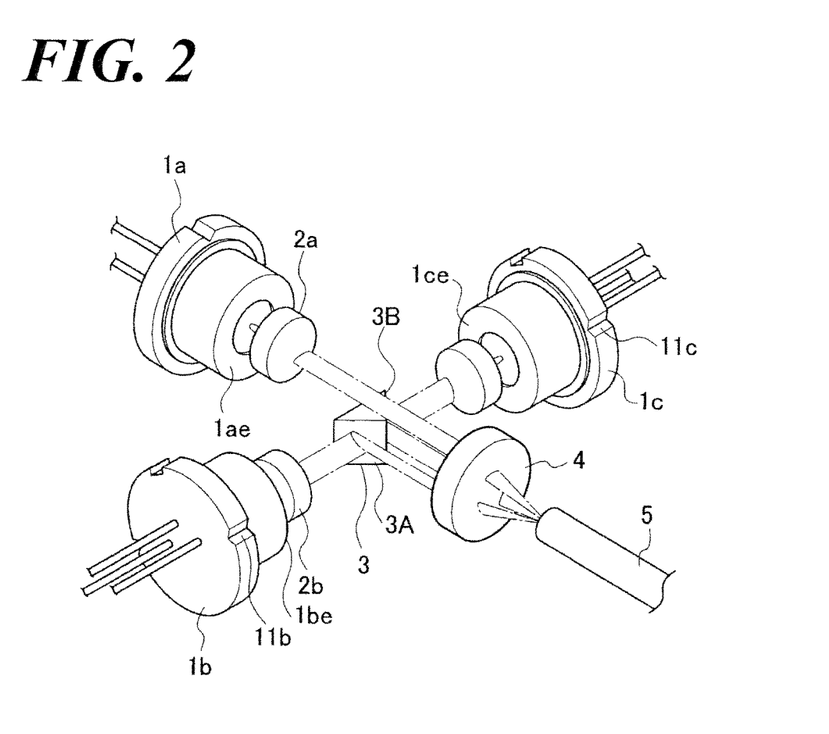
FIG. 2 is a detail block diagram illustrating the optical coupling module installed in the housing according to the aspect of the Embodiment 1 of the present invention.

FIG. 2 is a detail block diagram illustrating the optical coupling module installed to the housing according to the aspect of the Embodiment 1 of the present invention. The optical coupling module comprises the semiconductor lasers 1a-1c, the collimate lenses 2a-2c, the prism mirror 3, the convergence lens 4 and the fiber 5. Each of the semiconductor lasers 1a-1c irradiates the elliptic beam.

The semiconductor laser 1a corresponds to the first semiconductor laser of the present invention and emits the laser light to the collimate lens 2a. The collimate lens 2a that corresponds to the first lens of the present invention and in-place facing the semiconductor laser 1a collimates the laser light from the semiconductor laser 1a, so that the first collimate light passes through the headroom of the prism mirror 3.

The semiconductor laser 1b, which corresponds to the second semiconductor laser of the present invention and is in-place so that the emission plane 1be can be the plane approximately orthogonal to the emission plane 1ae of the semiconductor laser 1a, emits the laser light to the collimate lens 2b. The collimate lens 2b, which corresponds to the second lens of the present invention and in-place facing the semiconductor laser 1b, collimates the laser light from the semiconductor laser 1b and emits the second collimate light to the first reflection plane 3A of the prism mirror 3.

The semiconductor laser 1c, which corresponds to the third semiconductor laser of the present invention and is in-place so that the emission plane 1ce facing the emission plane 1be of the semiconductor laser 1b, emits the laser light to the collimate lens 2c. The collimate lens 2c, which corresponds to the third lens of the present invention and in-place facing the semiconductor laser 1c, collimates the laser light from the semiconductor laser 1c and emits the third collimate light to the second reflection plane 3B of the prism mirror 3.

The prism mirror 3 is in-place between the collimate lens 2b and the collimate lens 2c and in addition, between the collimate lens 2a and the convergence lens 4. The prism mirror 3 comprises the rectangular prism having a first reflection plane 3A that reflects the second collimate light to the parallel direction to the first collimate light and a second reflection plane 3B that is orthogonal to the first reflection plane 3A and reflects the third collimate light to the parallel direction to the first collimate light.

In addition, the semiconductor lasers 1a-1c are mounted in the housing 10 so that the fast axis directions of the second collimate light and the third collimate light are in-place at the location concentrically rotated respectively 120-degrees relative to the fast axis direction of the first collimate light in the convergence lens incident plane.

Next, the inventors set forth an operation of the optical coupling module according to the aspect of the Embodiment 1. First, the emission light from the semiconductor laser 1a mounted on the plane facing the plane, on which the fiber 5 is in-place, has an elliptical shape (oval) of which the fast axis direction is parallel to the bottom plane of the housing 10 is incident to the convergence lens 4 following passing through the collimate lens 2a and then further passing through the headroom of the prism mirror 3.

The semiconductor laser 1b is approximately orthogonal to the semiconductor laser 1a, the semiconductor laser 1b and the semiconductor laser 1c face to each other, the first collimate light passes through the headroom of the prism mirror 3, the second collimate light is reflected to the parallel direction to the first collimate light on the first reflection plane 3A, and the third collimate light is reflected to the parallel direction to the first collimate light on the second reflection plane 3B.

Figure 3:
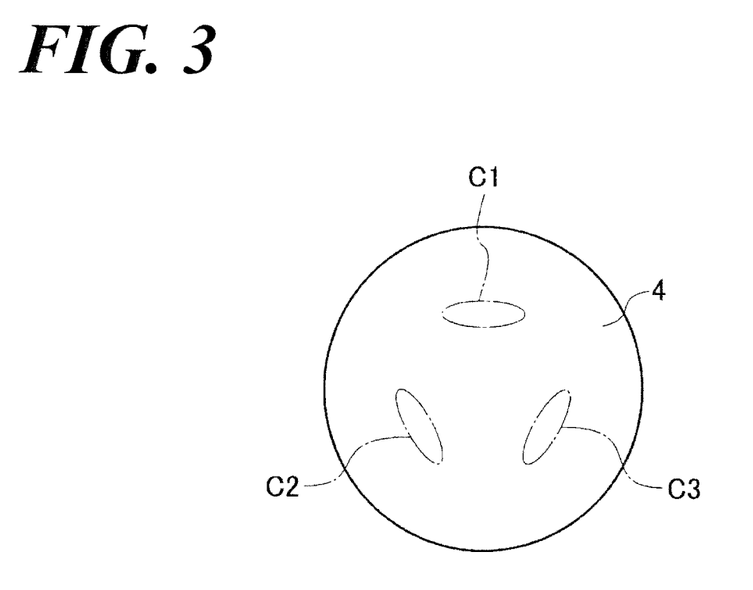
FIG. 3 is a schematic view illustrating the collimate light incident location into the converging lens of the optical coupling module according to the aspect of the Embodiment 1 of the present invention.

And all collimate lights from the first collimate light to the third collimate light are converged by the convergence lens 4 and then incident into the fiber 5. Referring to FIG. 3, each incident location of collimate lights to the convergence lens 4 is indicated. Referring to FIG. 3, three-incident collimate lights C1-C3 to the convergence lens 4 are arranged respectively to each location that is on the same circle and turns 120-degrees from each other.

Specifically, each collimate light is coaxially aligned while suppressing the spherical aberration effect of each light, so that the convergence lens 4 can be made smaller and as a result, the optical coupling module can be miniaturized. In addition, the number of the optical element can be less in accordance with the use of the prism mirror 3.

Embodiment 2

Figure 4:
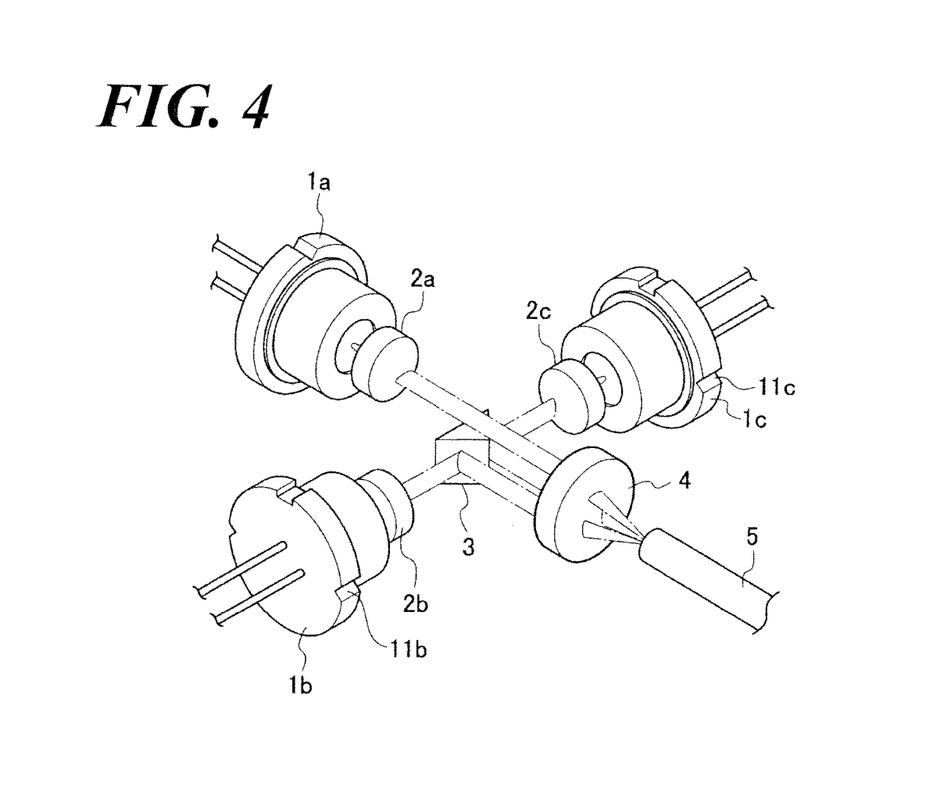
FIG. 4 is a block diagram illustrating the optical coupling module according to another aspect of the Embodiment 2 of the present invention.

FIG. 4 is a block diagram illustrating the optical coupling module according to the aspect of the Embodiment 2 of the present invention. With respect to the optical coupling module according to the aspect of the Embodiment 2, the semiconductor lasers 1a-1c is mounted in the housing 10 so that the fast axis directions of the second collimate light and the third collimate light are parallel to each other and orthogonal to the fast axis direction of the first collimate light on the incident plane of the convergence lens.

In such case, referring to FIG. 4, the semiconductor lasers 1b, 1c indicated in FIG. 2 are turned 30-degrees clockwise to be in-place in such location. Specifically, the groove 11b of the semiconductor laser 1b indicated in FIG. 4 and the groove 11c of the semiconductor laser 1c indicated in FIG. 2 turns 30-degrees clockwise from the groove 11b of the semiconductor laser 1b and the groove 11c of the semiconductor laser 1c.

Figure 5:
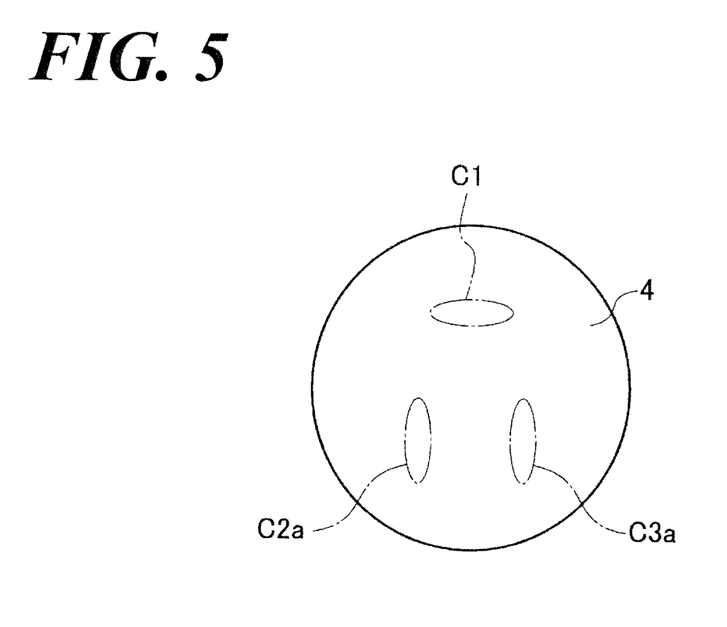
FIG. 5 is a schematic view illustrating the collimate light incident location into a converging lens of the optical coupling module according to Embodiment 2 of the present invention.

Referring to FIG. 5, the fast axis directions of the second collimate light C2a and the third collimate light C3a are parallel to each other and orthogonal to the fast axis direction of the first collimate light C1 on the incident plane of the convergence lens.

When the spherical aberration of the convergence lens 4 is out of consideration, the optical coupling module according to the aspect of the Embodiment 2 is adopted, so that the convergence lens 4 can further be made smaller.

Embodiment 3

Figure 6:
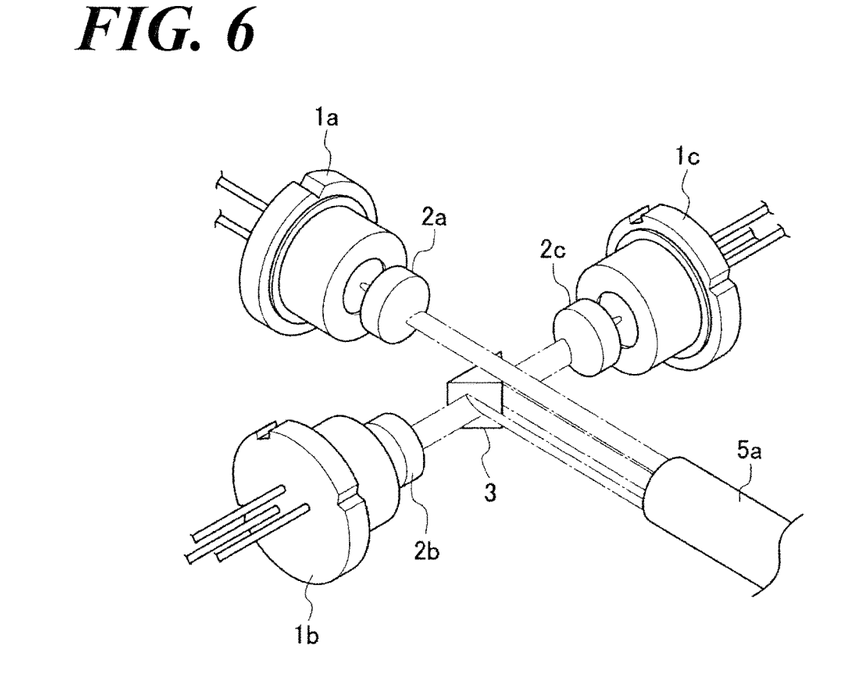
FIG. 6 is a block diagram illustrating the optical coupling module according to an Embodiment 3 of the present invention.

FIG. 6 is a block diagram illustrating the optical coupling module according to the aspect of the Embodiment 3 of the present invention. The optical coupling module according to the aspect of the Embodiment 3 does not include a convergence lens 4 compared to the optical coupling module according to the aspect of the Embodiment 1, 2. Referring to FIG. 6, when the diameter of the fiber 5a is significantly larger than the diameter of the collimate lights C1-C3, the convergence lens 4 can be eliminated and as a result, the laser light from the prism mirror 3 can be directly incident into the fiber 5a.

In such case, no convergence lens 4 is involved, miniaturization and cutting the cost for the system can be further achieved.

INDUSTRIAL APPLICABILITY

The present invention is applicable to an optical coupling module and so forth.

REFERENCE OF SIGNS 1a-1c Semiconductor laser
1ae-1ce Emission plane
2a-2c Collimate lens
3 Prism mirror
3A First reflection plane
3B Second reflection plane
4 Convergence lens
5 Fiber
10 Housing
10A-10D Side of a housing
10a Hole
C1 First collimate light
C2 Second collimate light
C3 Third collimate light It will be further understood by those of skill in the art that the apparatus and devices and the elements herein, without limitation, and including the sub components such as operational structures, relays, routers, fiber connectors, fixtures, reflectors, wave plates, lasers, etc, and related elements, control elements of all kinds, circuits and systems and elements, any necessary elements, inputs, sensors, detectors, memory elements, processors and any combinations of these structures etc. as will be understood by those of skill in the art as also being identified as or capable of operating the systems and devices and subcomponents noted herein and structures that accomplish the functions without restrictive language or label requirements since those of skill in the art are well versed in related optical coupling modules, laser systems, laser controls, light wave modules, and technologies of laser devices and all their sub components, including various mirrors, lenses, relays, brackets, structures, and circuits and combinations of the same without departing from the scope and spirit of the present invention.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. An optical coupling module, comprising:
   a first semiconductor laser that has a first emission plane;
   a first lens that collimates a light from said first semiconductor laser and then outputs a first collimate light along said first emission plane;
   a second semiconductor laser that has a second emission plane that is approximately orthogonal to said first emission plane of said first semiconductor laser;
   a second lens that collimates a light from said second semiconductor laser and then outputs a second collimate light;
   a third semiconductor laser that has a third emission plane that is facing said second emission plane of said second semiconductor laser;
   a third lens that collimates a light from said third semiconductor laser and then outputs a third collimate light;
   a prism mirror that further comprises:
      a rectangular prism having a first reflection plane that reflects said second collimate light to a parallel direction to said first collimate light and a second reflection plane that is orthogonal to said first reflection plane and reflects said third collimate light to a parallel direction to said first collimate light; and
   a housing that houses said first semiconductor lasers, said second semiconductor laser and said third semiconductor laser.

2. The optical coupling module, according to claim 1, further comprising:
   a convergence lens;
   wherein said convergence lens converges said first collimate light, which passes through a headroom of said prism mirror, said second collimate light, and said third collimate light, which said prism mirror emits, to be incident into a fiber.

3. The optical coupling module, according to claim 2, further comprising;
   a housing;
   each of said first, said second, and said third collimate lights is an elliptical beam;
   said first, said second, and said third semiconductor lasers are mounted in said housing so that a fast axis direction of said second collimate light and a fast axis direction of said third collimate light are concentrically in-place on a same circle as a fast axis direction of said first collimate light on an incident plane of said convergence lens; and
   wherein a center of each said first, said second, and said third collimate lights is positioned respectively 120-degrees from one another.

4. The optical coupling module, according to claim 2, wherein:
   each of said first, said second, and said third collimate light is an elliptical beam;
   said first, said second, and said third semiconductor lasers are mounted in said housing so that a fast axis direction of said second collimate light and a fast axis direction of said third collimate light are parallel to each other and orthogonal to a fast axis direction of said first collimate light on an incident plane relative to said convergence lens.

* * * * *